March 7, 1939.

N. H. WILLBY

Re. 21,026

CONTROL SYSTEM

Original Filed June 21, 1933

WITNESSES:

C. J. Weller.

K. Schilcot

INVENTOR

Norman H. Willby.

BY

W. M. Crawford

ATTORNEY

Reissued Mar. 7, 1939

Re. 21,026

UNITED STATES PATENT OFFICE 21,026

CONTROL SYSTEM

Norman H. Willby, Irwin, Pa., assignor to Westinghouse Electric & Manufacturing Company, East Pittsburgh, Pa., a corporation of Pennsylvania Original No. 2,000,728, dated May 7, 1935, Serial No. 676,846, June 21, 1933. Application for reissue July 31, 1936, Serial No. 93,624

12 Claims. (Cl. 172—179)

Figures 1, 2:
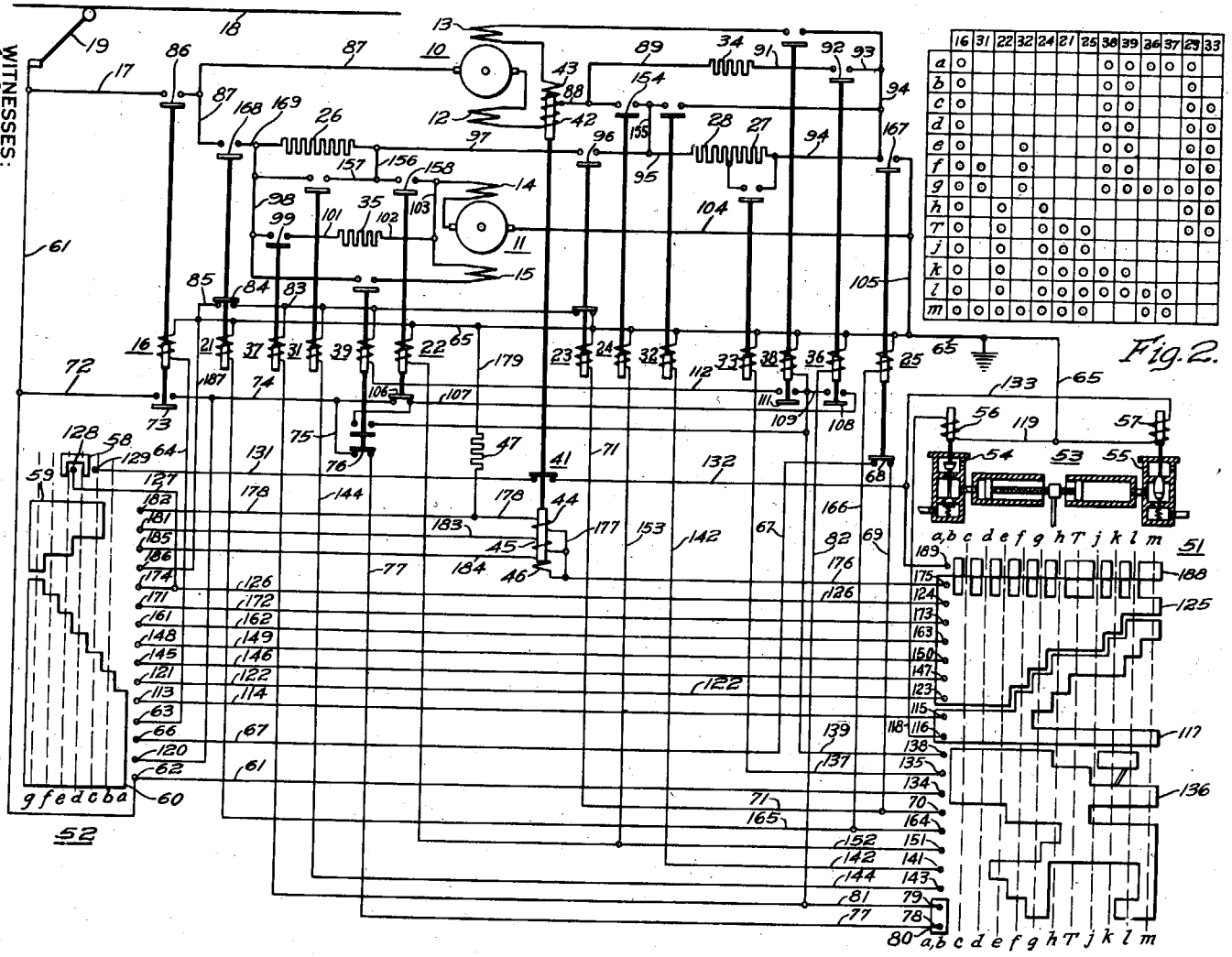

My invention relates, generally, to control systems and, more particularly, to systems for controlling the operation of the propelling motors of electric vehicles.

An object of my invention, generally stated, is to provide a control system which shall be simple and efficient in operation and which may be economically manufactured and installed.

A more specific object of my invention is to provide for simultaneously varying the speed and the tractive effort or torque of the propelling motors of an electric vehicle.

Another object of my invention is to provide an automatic accelerating system in which the speed of the motors may be reduced without first disconnecting the motors from the power source.

A further object of my invention is to provide a limit relay which will so control an automatic accelerating system that the motors will produce a predetermined tractive effort.

A still further object of my invention is to prevent the jolting of the passengers on a car when power is first applied to the propelling motors, thereby increasing the comfort of the passengers.

Other objects of my invention will be described fully hereinafter, or will be apparent to those skilled in the art.

The invention, accordingly, is disclosed in the embodiment thereof shown in the accompanying drawing, and comprises the features of construction, combination of elements and arrangement of parts which will be exemplified in the construction hereinafter set forth and the scope of the application of which will be indicated in the claims.

For a fuller understanding of the nature and objects of the invention, reference may be had to the following detailed description, taken in conjunction with the accompanying drawing, in which:

Figure 1 is a diagrammatic view showing the apparatus and the circuits of a motor control system embodying my invention, and Fig. 2 is a chart showing the sequence of operation of a part of the apparatus shown in Fig. 1.

Referring to the drawing, the system shown comprises motors 10 and 11 which are of a type suitable for propelling electric vehicles. Each of the motors are provided with two series field windings, the motor 10 having field windings 12 and 13, and the motor 11 having field windings 14 and 15. A line switch 16 is provided for connecting the motors 10 and 11 to a power conductor 17, which may be connected to a trolley conductor 18 by means of a trolley 19. The trolley conductor 18 may be energized from any suitable source of power, as a generating station (not shown).

The motors 10 and 11 are connected in series-circuit relation when it is desired to start the vehicle. After it has been accelerated to a predetermined speed, the motors are connected in parallel-circuit relation in order that the speed of the vehicle may be increased further. Electrically-operated switches 21, 22, 23, 24 and 25 are provided for establishing the necessary circuits to connect the motors in either series or parallel circuit relation.

In accordance with the usual practice, resistors 26, 27 and 28 are provided for controlling the motor current and the acceleration of the motors. Accelerating switches 31, 32 and 33 are disposed to shunt the resistors 26, 27 and 28 to accelerate the motors in a manner well known in the art.

With a view to varying the speed at which the motors 10 and 11 operate, provision is made for shunting the field windings 13 and 15 through resistors 34 and 35, respectively, thereby controlling the field strength of the motors and, consequently, their speed. Electrically-operated switches 36 and 37 are disposed to shunt the field windings 13 and 15, respectively. Provision is also made for disconnecting the field windings 13 and 15 from the motor circuits by means of switches 38 and 39 in order that the speed of the motors may be varied over a greater range. In this manner, the field strength of the motors 10 and 11 may be so controlled that the motors will operate at several different speeds corresponding to "full" field, "shunted" field and "tapped" field, thereby providing a wide range of speed control.

In order that the acceleration of the motors may be automatically controlled, a current-limit relay 41 is connected in the motor circuit as shown. The relay 41 is provided with a series coil which is divided into two sections 42 and 43 which are connected in series with the field windings 12 and 13, respectively, of the motor 10. The coils 42 and 43 are, therefore, energized by the current flowing through the field windings 12 and 13, respectively, and the relay 41 is actuated by a force proportional to the field strength of the motor 10. Since the torque or tractive effort of a motor is directly proportional to the armature current and the field strength, the relay 41 will permit sufficient current to flow through the motors to maintain their tractive effort at a predetermined value.

With a view to permitting the rate of acceleration of the motors to be varied to suit operating conditions, the limit relay 41 is provided with three loading coils 44, 45 and 46, which are disposed to oppose the actuating coils 42 and 43. When the loading coils are energized, the amount of current necessary in the actuating coils 42 and 43 to open the contact members of the relay is increased, thereby increasing the amount of current permitted to flow through the motors 10 and 11 during each step of acceleration and, consequently, increasing the rate of acceleration of the motors. A resistor 47 is provided to control the current in the loading coils 44, 45 and 46.

The limit relay 41 cooperates with a sequence switch 51 to automatically control the operation of the transfer, accelerating and field shunting switches, previously described. The sequence switch 51 is automatically advanced step-by-step to control the operation of the foregoing switches upon the actuation of a master controller 52 to set it in operation. As illustrated, the sequence switch comprises a plurality of contact fingers disposed to engage contact segments mounted upon a drum which is actuated by an air engine 53.

The operation of the air engine 53 is controlled by magnet valves 54 and 55 which are actuated by magnet coils 56 and 57, respectively. The air engine 53 is so constructed that the drum of the sequence switch 51 is advanced from position *"a"* toward position *"m"* when both of the magnet coils 56 and 57 are energized. When both of the coils 56 and 57 are deenergized, the drum is actuated toward position *"a."* The drum may be stopped and retained in any intermediate position by energizing the coil 56 and deenergizing the coil 57 simultaneously.

A "lost motion" device 58 is incorporated in the controller 52 in order that the sequence switch may be readily stopped at any time. The "lost motion" device is similar in construction to, and functions in the same manner as, the device described in my copending application Serial No. 676,845, filed June 21, 1933 and assigned to the Westinghouse Electric & Manufacturing Company. A slight backward movement of the controller handle interrupts the circuit through the magnet coil 57 and stops the sequence switch.

In order that the speed of the motors may be reduced without first disconnecting them from the power source, as has been necessary in previously known automatic accelerating systems, the master controller 52 and the sequence switch 51 are so constructed that the drum of the sequence switch may be actuated to any one of several positions corresponding to certain positions of the master controller by actuating the controller to the desired position. For example, if the master controller and the sequence switch are on positions *"g"* and *"m"*, respectively, in which case the motors will be operating at maximum speed, and it is desired to operate at a lower speed, the master controller may be actuated to any intermediate position, as, for instance, position *"c"* and the sequence drum will be immediately returned to position *"g"*, thereby causing the motors to operate at a speed corresponding to position *"c"* of the controller.

With a view to preventing the uncomfortable jolt experienced by the passengers when power is first applied to the motors, provision is made for reducing the torque of the motors at the instant of starting and gradually increasing the motor torque to its maximum value. In the present embodiment of the invention, the field windings 13 and 15 of the motors are shunted when the motors are first connected to the power source, thereby reducing the field strength and the torque of the motors. Full field strength is applied shortly after the motors are connected to the power source. In this manner the torque of the motors is increased gradually and the vehicle is started without jolting the passengers.

In order that the speed and the tractive effort of the motors may be varied simultaneously by the operator, contact segments 59 and 60 are so disposed on the master controller 52 that the energization of the loading coils 44, 45 and 46, on the limit relay 41, and also the energization of the field windings 13 and 15 may be controlled by operating the controller 52. As explained hereinbefore, the tractive effort of the motors may be varied by controlling the energization of the loading coils on the limit relay, which is accomplished by means of the contact segment 59 on the master controller. The operation of the switches 36 and 38, and 37 and 39 which govern the energization of the field windings 13 and 15, respectively, is controlled by the sequence switch 51. However, the position to which the sequence switch may advance is controlled by the position on which the master controller is set. Thus, if the controller is set on position *"e"*, the sequence switch will be stopped on position *"k"* and the switches 36 and 37 will not be closed to shunt the field windings 13 and 15. In this manner, the speed at which the motors 10 and 11 operate may be controlled.

In order that the functioning of the foregoing apparatus may be more clearly understood, the operation of the system will now be described. Assuming that it is desired to connect the motors 10 and 11 to the power conductor 17 to start the vehicle, the master controller 52 may be actuated to position *"a"*, thereby establishing an energizing circuit for the actuating coil of the line switch 16. This circuit may be traced from a conductor 61, which is connected to the trolley 19, through contact fingers 62 and 63, bridged by the contact segment 60, conductor 64 and the actuating coil of the switch 16 to a grounded conductor 65.

At this time, a circuit is also established through the actuating coil of the switch 23, which may be traced from a contact finger 66 on the controller 52, through conductor 67, an interlock 68 on the switch 25, conductors 69 and 71, and the actuating coil of the switch 23 to the grounded conductor 65.

As explained hereinbefore, provision is made for shunting the field windings 13 and 15 of the motors 10 and 11 when power is first applied to the motors in order to reduce the initial torque of the motor. Accordingly, energizing circuits are established at this time for the actuating coils of the switches 36 and 37, which are disposed to shunt the field windings 13 and 15, respectively, through the resistors 34 and 35. The circuits through the actuating coil of the switch 36 may be traced from the conductor 61 through conductor 72, an interlock 73 on the switch 16, conductors 74 and 75, an interlock 76 on the switch 39, conductor 77, contact fingers 78 and 79, bridged by a contact segment 80 on the sequence switch 51, conductors 81 and 82, and the actuating coil of the switch 36 to the grounded conductor 65. The actuating coil of the switch 37 is energized simultaneously with the coil of the switch 36 through a circuit which extends from the conductor 81 through the coil of the switch 37, conductor 83, an interlock 84 on the switch 21 and conductor 85 to the grounded conductor 65.

The motors 10 and 11 are now connected in series-circuit relation and are connected to the power conductor 17. The motor circuit may be traced from the conductor 17 through the contact members 86 of the switch 16, conductor 87, the armature winding of the motor 10, the field winding 12 of the motor 10, the series coil 42 of the limit relay 41, conductors 88 and 89, the resistor 34, conductor 91, the contact members 92 of the switch 36, conductors 93 and 94, the resistors 27 and 28, conductor 95, the contact members 96 of the switch 23, conductor 97, the resistor 26, conductor 98 of the contact members 99 of the switch 37, conductor 101, the resistor 35, conductors 102 and 103, the field winding 14, the armature winding of the motor 11 and conductors 104 and 105 to the grounded conductor 65.

Upon the closing of the switch 36, a circuit is established for the actuating coil of the switch 38, thereby closing this switch to connect the field winding 13 in the motor circuit to increase the torque developed by motor 10. This circuit may be traced from the previously energized conductor 74 through an interlock 106 on the switch 22, conductor 107, an interlock 108 on the switch 36, conductor 109 and the actuating coil of the switch 38 to the grounded conductor 65.

When the switch 38 is closed, an energizing circuit is established for the actuating coil of the switch 39 to close this switch and connect the field winding 15 in the motor circuit. This circuit may be traced from the previously energized conductor 109 through an interlock 111 on the switch 38, conductor 112, the actuating coil of the switch 39, conductor 83, the interlock 84 and conductor 85 to the grounded conductor 65. It will thus be seen that the field windings 13 and 15 are energized successively, thereby gradually increasing the tractive effort of the motors 10 and 11, which will cause the vehicle to be started smoothly instead of with a sudden jerk.

When the switch 39 is closed, the energizing circuit for the actuating coils of the switches 36 and 37 is interrupted by the opening of the interlock 76 on the switch 39, thereby causing the switches 36 and 37 to be opened, which interrupts the shunt connections around the field windings 13 and 15 of the motors 10 and 11. In this manner full field excitation is applied to the motors, which causes them to develop their maximum tractive effort.

The motors 10 and 11 may be accelerated by actuating the controller 52 to position "b", thereby establishing an actuating circuit for the magnet coil 57, which will cause the sequence switch 51 to be operated by the air engine 53.

As explained hereinbefore, the drum of the sequence switch 51 is advanced when the magnet coils 56 and 57 are both energized. The magnet coil 56 was energized when the controller 52 was actuated to position "a", through a circuit which extends from a contact finger 113 through conductor 114, contact fingers 115 and 116, bridged by the contact segment 117, conductor 118, the magnet coil 56 and conductor 119 to the grounded conductor 65. The circuit through the magnet coil 57 may be traced from a contact finger 121 through conductor 122, contact fingers 123 and 124, bridged by contact segment 125, conductors 126 and 127, contact members 128 and 129 of the lost motion device 58, previously described, conductor 131, the contact members of the limit relay 41, conductors 132 and 133, the magnet coil 57 and conductor 119 to the grounded conductor 65.

When the sequence switch 51 advances to position "c" an energizing circuit is established for the actuating coil of the switch 33, thereby closing this switch to shunt the resistor 27. This circuit may be traced from the conductor 61 through contact fingers 134 and 135, bridged by a contact segment 136, conductor 137 and the actuating coil of the switch 33 to the grounded conductor 65. At this time, a contact finger 138 also engages the contact segment 136 to energize a conductor 139 which is connected to the conductor 109, thereby maintaining the energization of the actuating coils of the switches 38 and 39.

As the sequence switch passes through position "d" to position "e", an energizing circuit is established for the actuating coil of the switch 32. This circuit may be traced from contact finger 141 through conductor 142 and the actuating coil of the switch 32 to the grounded conductor 65. When the switch 32 is closed, the resistor 28 is shunted from the motor circuit.

When the sequence switch advances to position "f", the switch 31 is closed to shunt the resistor 26 from the motor circuit. The circuit through the actuating coil of the switch 31 extends from a contact finger 143 through conductor 144, the actuating coil of the switch 31, conductor 83, the interlock 84 and conductor 85 to the grounded conductor 65.

It will thus be seen that the series resistance has all been shunted from the motor circuit. However, as described hereinbefore, the speed of the motors may be increased by shunting the field windings 13 and 15 by closing the switches 36 and 37. When the sequence drum advances to position "g", the conductor 81 is energized to cause the switches 36 and 37 to be closed, as previously described.

The speed of the motors 10 and 11 may be still further increased by opening the switches 38 and 39 which disconnects the field windings 13 and 15 from the motor circuit, thereby further weakening the field strength of the motors and increasing their speed. The sequence switch 51 was advanced to position "g" by actuating the controller 52 to position "c", thereby energizing the contact finger 145, conductor 146 and the contact finger 147 to maintain the energization of the magnet coils 56 and 57 through their respective circuits previously described. Likewise, the sequence switch may be advanced to position "h" by actuating the controller 52 to position "d", thereby energizing the contact finger 148, conductor 149 and the finger 150.

When the sequence switch advances to position "h", the energizing circuit for the actuating coils of the switches 38 and 39 is interrupted, thereby disconnecting the field windings 13 and 15 from the motor circuit. At this time, energizing circuits are established for the actuating coil of the switches 22 and 24, thereby maintaining the connections through the motors 10 and 11. The energizing circuit through the actuating coil of the switch 22 may be traced from the contact finger 151 through conductor 152 and the coil of the switch 22 to the grounded conductor 65. The coil of the switch 24 is energized through conductor 153, which is connected to conductor 152.

The main motor circuit at this time may be traced from conductor 87 through the armature of the motor 10, field winding 12, the coil 42 of the limit relay 41, conductor 88, the contact members 154 of the switch 24, conductors 155 and 95, the contact members 96 of the switch 23, conductors 97, 156 and 157, the contact members 158 of the switch 22, the field winding 14, the armature of the motor 11 and conductors 104 and 105 to the grounded conductor 65.

As previously explained, the operation of the sequence switch 51 during the accelerating period is controlled by the limit relay 41. It will be readily understood that the current in the motor circuit increases when resistance is shunted from the circuit by the closing of the accelerating switches in the manner previously described. When the motor current increases above a predetermined value, the contact members of the relay 41 are opened by the force exerted by the series coil 42 and also the series coil 43 when the field winding 13 is connected in the motor circuit. The opening of the contact members of the relay 41 interrupts the energizing circuit for the magnet coil 57 thereby stopping the sequence drum. As the motors accelerate in speed their counter electro-motive force increases and the motor current is reduced, thereby permitting the contact members of the relay 41 to close, which permits the sequence switch 51 to be advanced another step. In this manner, the sequence switch is permitted to advance step-by-step under the control of the limit relay 41 to accelerate the motors.

If it is desired to further increase the speed of the motors 10 and 11 by connecting them in parallel-circuit relation, the controller 52 may be advanced to position "*e*", in which position a contact finger 161 engages the contact segment 60 to energize a conductor 162, a contact finger 163 and the contact segment 125 of the sequence switch 51, thereby keeping the conductor 126 energized and maintaining the circuit previously traced through the magnet coil 57. The sequence switch 51 will, therefore, advance through the transition step to position "*j*", during which time the switches 23 and 33 are permitted to open and the switches 21 and 25 are closed to connect the motors 10 and 11 in parallel circuit relation. The energizing circuit for the actuating coil of the switch 21 may be traced from a contact finger 164, which engages the contact segment 136, through conductor 165 and the coil of the switch 21 to the grounded conductor 65. The circuit for the coil of the switch 25 extends from the conductor 165 through conductor 166 and the coil of the switch 25 to the grounded conductor 65.

The motors are now connected in parallel circuit relation, the circuit through the motor 10 extending from the conductor 87 through the armature of the motor 10, the field winding 12, the coil 42 on the limit relay 41, the conductor 88, contact members 154 of the switch 24, conductors 155 and 95, the resistors 28 and 27, conductor 94, contact members 167 of the switch 25 and conductor 105 to the grounded conductor 65. The circuit for the motor 11 may be traced from the conductor 87 through the contact members 168 of the switch 21, conductor 169, the resistor 26, conductors 156 and 157, the contact members 158 of the switch 22, the field winding 14, the armature winding of the motor 11 and conductors 104 and 105 to the grounded conductor 65.

The sequence switch will continue to advance to position "*k*" since the drum of the switch is constructed in a manner to maintain the energizing circuit for the magnet coil 57. When the sequence switch is advanced to position "*k*", the switches 38 and 39 are closed to connect the field windings 13 and 15 in the motor circuit, as previously described.

The speed of the motors may be increased by actuating the controller 52 to position "*f*" to energize a contact finger 171, a conductor 172 and a contact finger 173 on the sequence switch, thereby permitting the sequence switch to advance to position "*l*". When the sequence switch is on position "*l*", the switches 36 and 37 are closed to shunt the field windings 13 and 15, as previously described.

The sequence switch may be advanced to position "*m*" by actuating the controller 52 to position "*g*" to energize a contact finger 174 to which the conductor 126 is connected.

When the sequence switch advances to position "*m*", the switches 31 and 32 are closed to shunt the resistors 26, 27 and 28 from the motor circuits, as previously described. At this time, the switches 38 and 39 are opened, thereby disconnecting the field windings 13 and 15 from the motor circuit which permits the motors to operate at their maximum speed.

As described hereinbefore, the limit relay 41 which controls the operation of the sequence switch 51, thereby controlling the rate of acceleration of the motors, is provided with the loading coils 44, 45 and 46 which are disposed to oppose the actuating coils 42 and 43. The loading coil 44 is energized through a circuit which extends from a contact finger 175, which engages the contact segment 125, through conductors 176 and 177, the coil 44, conductor 178, the resistor 47 and conductor 179 to the grounded conductor 65.

When the master controller 52 is actuated to position "*c*", the contact segment 59 bridges contact fingers 181 and 182, thereby energizing the loading coil 45 through a circuit which extends from the conductor 177 through the coil 45, conductor 183, the contact fingers 181 and 182, conductor 178, resistor 47 and the conductor 179 to the grounded conductor 65. When the controller is actuated to position "*e*", the loading coil 46 is energized through a circuit which may be traced from the conductor 176 through the coil 46, conductor 184, the contact fingers 185 and 182, conductor 178, resistor 47 and conductor 179 to the grounded conductor 65. The three coils 44, 45 and 46 are thereby energized to oppose the actuating coils 42 and 43, which increases the amount of current required to operate the relay 41 and causes the motors 10 and 11 to be accelerated at a higher rate.

When the controller 52 is actuated to position "*g*", the rate of acceleration is still further increased. The resistor 47 is shunted from the circuit through the coils 44, 45 and 46 when the controller is on position "*g*", as a contact finger 186 engages the contact segment 59 and connects the coils 44, 45 and 46 directly to the grounded conductor 65 through a conductor 187. In this manner, the current flowing through the loading coils 44, 45 and 46 is increased, thereby permitting a higher amount of current to flow through motors 10 and 11.

In this manner, the operator of the vehicle may vary both the rate of acceleration of the motors and the speed at which the motors operate by means of the controller 52. The highest rate of acceleration and also the maximum speed of the motors is obtained by actuating the controller to position "*g*". Lower rates of acceleration and lower operating speeds may be obtained by retaining the controller drum on some one of the intermediate positions.

In order to prevent the sequence switch 51 from stopping between positions when the circuit through the contact members of the relay 41 is interrupted, as previously described, a plurality of contact segments 188 on the sequence switch 51 are disposed to be engaged by a contact finger 189 while the sequence switch is being actuated from one position to the next, thereby maintaining the energizing circuit through the magnet coil 57. In this manner, the sequence switch is prevented from stopping between operating positions.

In accordance with the usual practice, the motors 10 and 11 may be disconnected from the power source to stop the vehicle by returning the master control 52 to the "off" position, which permits the line switch 16 to be opened to disconnect the motors from the power source. When the master controller is actuated to the "off" position, the sequence switch 51 is returned to position "*a*", thereby permitting all of the switches controlled by it to be actuated to the deenergized position.

I do not desire to be restricted to the specific embodiment or arrangement of parts herein shown and described, since it is evident that they may be changed and modified without departing from the spirit and scope of my invention as defined in the appended claims.

I claim as my invention:

1. In a motor control system, in combination, a motor having a normal series field winding and an additional series field winding, a source of power for the motor, switching means for controlling the energization of the additional field winding to vary the motor speed, means for automatically controlling the acceleration of the motor, a relay for controlling the tractive effort of the motor, means associated with said relay for varying the tractive effort of the motor, means associated with the acceleration-controlling means for controlling the operation of said switching means, and a master controller for governing the operation of the acceleration-controlling means and the means for varying the tractive effort, whereby the tractive effort and the speed of the motor may be varied simultaneously.

2. In a motor control system, in combination, a motor having a normal series field winding and an additional series field winding, a source of power for the motor, switching means for controlling the energization of the additional field winding to vary the motor speed, a sequence switch for automatically controlling the acceleration of the motor, means associated with the sequence switch for controlling the operation of said switching means, a master controller, a limit relay responsive to the armature current and the field strength of the motor and cooperating with the master controller to control the operation of the sequence switch, means associated with the limit relay for varying the tractive effort of the motor, and means associated with the master controller for governing the operation of the relay, whereby the tractive effort and the speed of the motor may be varied simultaneously.

3. In a motor control system, in combination, a motor having a field winding, a source of power for the motor, means for varying the current in the field winding of the motor to vary the motor speed, means for automatically controlling the acceleration of the motor, a relay having a coil energized by the armature current of the motor for controlling the operation of the acceleration-controlling means, means on said relay responsive to the field strength of the motor for causing the tractive effort of the motor to be maintained at a predetermined value, and a master controller for governing the operation of said relay.

4. In a motor control system, in combination, a motor having a field winding, a source of power for the motor, means for varying the current in the field winding of the motor to vary the motor speed, means for automatically controlling the acceleration of the motor, a relay having an actuating coil connected in the field winding circuit for controlling the operation of the acceleration-controlling means, means on said relay disposed to oppose the actuating coil, and a master controller for controlling the energization of the last-named means.

5. In a motor control system, in combination, a motor having a normal series field winding and an additional series field winding, a source of power for the motor, switching means for controlling the energization of the additional field winding to vary the motor speed, means for automatically controlling the acceleration of the motor, and a relay for controlling the operation of the acceleration-controlling means, said relay having an actuating coil connected in the normal field winding circuit and another coil connected in the additional field winding circuit, whereby the tractive effort of motor may be maintained at a predetermined value.

6. In a motor control system, in combination, a motor having a series field winding, a source of power for the motor, means for connecting the motor to the power source, means for controlling the energization of the field winding of the motor, and means for automatically reducing the field strength of the motor when power is first applied to the motor and for increasing the field strength within a predetermined time interval after the motor is connected to the power source.

7. In a motor control system, in combination, a motor having a series field winding, a source of power for the motor, means for connecting the motor to the power source, switching means for controlling the energization of the field winding of the motor, and interlocking means associated with said switching means for automatically reducing the field strength of the motor and for gradually increasing the field strength after the motor is connected to the power source.

8. In a motor control system, in combination, a motor having a normal series field winding and an additional series field winding, a source of power for the motor, means for connecting the motor to the power source, switching means for controlling the energization of the additional field winding to vary the field strength of the motor, and interlocking means associated with the switching means for controlling the operation of said switching means to cause the field strength of the motor to be reduced when power is first applied to the motor and to be gradually increased after the motor is connected to the power source.

9. The combination with a plurality of motors each provided with a field winding and a controller for controlling the amount of resistance in circuit with said motors, of means for establishing first series and then parallel circuit relation of said motors with resistance in circuit with each circuit, field shunting circuits for said motors controlled by said controller for starting said motors on reduced field and for completing the acceleration of said motors after they have been connected in parallel by again reducing the field excitation of said motors.

10. The combination with a plurality of motors each provided with a field winding and a controller for controlling the amount of resistance in circuit with said motors, of means for establishing first series and then parallel circuit relation of said motors with resistance included in each branch of the parallel circuit, field shunting circuits for said motors controlled by said controller for starting said motors on reduced field and for completing the acceleration of said motors after they have been connected in parallel by again reducing the field excitation of said motors, and means for varying the speed of operation of said controller.

11. In combination, a motor provided with a field winding arranged to produce a magnetic field for said motor, control means for accelerating said motor from standstill to a maximum speed, field shunting means operatively associated with said control means for reducing substantially said field excitation during the initial and final acceleration of said motor, said field shunting means being ineffective during the intermediate acceleration of said motor.

12. In a motor control system, in combination, a motor having a series field winding, a source of power for the motor, means for connecting the motor to the power source to accelerate the motor, means for controlling the energization of the field winding of the motor, and means for reducing the field strength of the motor during the initial and final acceleration of said motor, said field strength being at a maximum during the intermediate acceleration of said motor.

NORMAN H. WILLBY.